(12) United States Patent
Mann et al.

(10) Patent No.: US 8,664,150 B2
(45) Date of Patent: Mar. 4, 2014

(54) METHODS OF PRODUCING ADSORPTION MEDIA INCLUDING A METAL OXIDE

(75) Inventors: Nicholas R. Mann, Rigby, ID (US); Troy J. Tranter, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 455 days.

(21) Appl. No.: 12/725,142

(22) Filed: Mar. 16, 2010

(65) Prior Publication Data

US 2011/0230339 A1   Sep. 22, 2011

(51) Int. Cl.
| | | |
|---|---|---|
| C01B 13/14 | (2006.01) | |
| C01G 3/02 | (2006.01) | |
| C01G 5/00 | (2006.01) | |
| C01G 25/02 | (2006.01) | |
| C01G 49/02 | (2006.01) | |
| C01G 49/06 | (2006.01) | |
| C01G 41/02 | (2006.01) | |
| C01G 39/02 | (2006.01) | |
| C01G 30/00 | (2006.01) | |
| C01G 29/00 | (2006.01) | |
| C01G 28/00 | (2006.01) | |
| C01G 23/04 | (2006.01) | |
| C01G 21/02 | (2006.01) | |
| C01G 19/02 | (2006.01) | |
| C01G 15/00 | (2006.01) | |
| C01G 9/02 | (2006.01) | |
| C01G 13/02 | (2006.01) | |

(52) U.S. Cl.
USPC ........ 502/400; 502/406; 502/439; 423/592.1; 423/604; 423/608; 423/617; 423/618; 423/624; 423/632; 423/633; 423/594.18

(58) Field of Classification Search
USPC ............... 423/592.1, 632, 633; 502/400, 406; 210/681, 683, 684, 688, 747.7, 747.8; 252/178, 181; 524/430, 43, 435
See application file for complete search history.

(56) References Cited

U.S. PATENT DOCUMENTS

| | | |
|---|---|---|
| 4,039,444 A | 8/1977 | Bory et al. |
| 4,576,969 A | 3/1986 | Echigo et al. |
| 4,624,845 A | 11/1986 | Laundon et al. |
| 5,591,346 A | 1/1997 | Etzel et al. |
| 5,595,666 A | 1/1997 | Kochen et al. |

(Continued)

FOREIGN PATENT DOCUMENTS

RU   2045994 C1   10/1995

OTHER PUBLICATIONS

Arsenic in Drinking Water: 2001 Update, National Research Council, National Academy Press, 24-69, 2001.

(Continued)

Primary Examiner — Steven Bos
Assistant Examiner — Justin Bova
(74) Attorney, Agent, or Firm — TraskBritt

(57) ABSTRACT

Methods of producing a metal oxide are disclosed. The method comprises dissolving a metal salt in a reaction solvent to form a metal salt/reaction solvent solution. The metal salt is converted to a metal oxide and a caustic solution is added to the metal oxide/reaction solvent solution to adjust the pH of the metal oxide/reaction solvent solution to less than approximately 7.0. The metal oxide is precipitated and recovered. A method of producing adsorption media including the metal oxide is also disclosed, as is a precursor of an active component including particles of a metal oxide.

13 Claims, 3 Drawing Sheets

(56) References Cited

U.S. PATENT DOCUMENTS

| | | | |
|---|---|---|---|
| 5,788,826 | A | 8/1998 | Nyberg |
| 5,895,796 | A | 4/1999 | Mouri et al. |
| 6,001,258 | A | 12/1999 | Sluys et al. |
| 6,045,697 | A | 4/2000 | Girot et al. |
| 6,136,199 | A | 10/2000 | SenGupta et al. |
| 6,232,265 | B1 | 5/2001 | Bruening et al. |
| 6,290,848 | B1 | 9/2001 | Tanner et al. |
| 6,461,535 | B1 | 10/2002 | de Esparza |
| 6,641,719 | B1 | 11/2003 | Naito |
| 6,656,350 | B2 | 12/2003 | Kitakaze |
| 6,809,062 | B2 | 10/2004 | Driehaus |
| 6,881,327 | B2 | 4/2005 | Tanner et al. |
| 6,881,333 | B2 | 4/2005 | Ozeki et al. |
| 6,914,034 | B2 | 7/2005 | Vo |
| 7,368,412 | B2 * | 5/2008 | Tranter et al. ............... 502/406 |
| 7,429,551 | B2 | 9/2008 | Vo |
| 2002/0121470 | A1 | 9/2002 | Mann et al. |
| 2005/0247636 | A1 * | 11/2005 | Schlegel .................. 210/688 |
| 2005/0288181 | A1 * | 12/2005 | Tranter et al. ............... 502/400 |

OTHER PUBLICATIONS

Borgono, J. M., Vincent, P., Venturino, H., Infante, A. Arsenic in the Drinking Water of the City of Antofagasta: Epidemiological and Clinical Study before and after Installation of a Treatment Plant. Environmental Health Perspectives, 19, 103-105, 1997.
Bowen, H. J. M. (1979). Elemental Chemistry of the Elements, Academic Press, London and New York, 13-62.
Chakravarty, S., Durega, V., Bhattacharyya, G., Maity, S., Bhattacharjee, S. Removal of Arsenic from Groundwater Using Low Cost Ferruginous Manganese Ore. Water Research, 36, 625-632, 2002.
Chanda, et al., "Ligand Exchange Sorption of Arsenate and Arsenite Anions by Chelating Resins in Ferric Ion Form: I. Weak-Base Chelating Resin Dow XFS-4195," Reactive Polymers, 7 (1988) pp. 251-261.
Chanda, et al., "Ligand Exchange Sorption of Arsenate and Arsenite Anions by Chelating Resins in Ferric Ion Form: II. Iminodiacetic Chelating Resin Chelex 100," Reactive Polymers, 8 (1988) pp. 85-95.
Chen, S. L., Dzeng, S. R., Yang, M. H., Chiu, K. H., Shieh, G. M., Wai, C. M. Arsenic Species in Groundwaters of he Blackfoot Disease Area, Taiwan. Environmental Science and Technology, 28, 877-881, 1994.
Chwirka, J. D., Thomson, B. M., Stomp, J. M. Removing Arsenic from Groundwater. Jour. American WaterWorks Assoc., 92(3), 79-88, 2000.
Dambies, L. Existing and Prospective Sorption Technologies for the Removal of Arsenic in Water. Separation Science and Technology, 39(3), 603, 627, 2004.
Das, D., Samanta, G., Mandal, B. K., Chowdhury, T. R., Chandra, C. R., Chowdhurry, P. P. , Basu, G. K., Chakraborti, D. Arsenic in Groundwater in Six Districts of West Bengal, India. Environ. Geochem. Hlth., 18, 5-15, 1996.
Daus, B., Wennrich, R., Weiss, H. Sorption Materials for Arsenic Removal from Water: A Comparative Study. Water Research, 38, 2948-2954, 2004.
Del Razo, L. M., Arellano, M.A., Cebrian, M. E. The Oxidation States of Arsenic in Well Water from a Chronic Arsenicism Area of Northern Mexico. Environmental Pollution, 64, 143-153, 1990.
DeMarco, et al., "Arsenic Removal Using a Polymeric/Inorganic Hybrid Sorbent," Water Research 37 (2003) pp. 164-176.
Gulledge, J. H., O'Conner, J. T. Removal of Arsenic(V) from Water by Adsorption on Aluminum and Ferric Hydroxides. Jour. American WaterWorks Assoc., 548-552, 1973.
Jambor, J. L., Dutrizac, J. E. Occurrence and Constitution of Natural and Synthetic Ferrihydrite, a Widspread Iron Oxyhydroxide. Chem. Rev., 98, 2549-2585, 1998.
Janney et al., "Structure of synthetic 2-line ferrihydrite by electron nanodiffraction," American Mineralogist, vol. 85, pp. 1180-1187, 2000.
Janney et al., "Structure of synthetic 6-line ferrihydrite by electron nanodiffraction," American Mineralogist, vol. 86, pp. 327-335, 2001.
Masud, K. Arsenic in Groundwater and Health Problems in Bangladesh. Water Research, 34, 304-310, 2000.
McKenzie et al., "Direct electrochemistry of nanoparticulate Fe2O3 in aqueous solution and adsorbed onto tin-doped indium oxide," Pure Apl. Chem., vol. 73, No. 12, pp. 1885-1894, 2001.
Navratil, James D., "Adsorption and Nanoscale Magnetic Separation of Heavy Metals from Water," Clemson University, 8 pages, no date.
Nickolaidis, N. P., Dobbs, G. M., Lackovic, J. A. Arsenic Removal by Zero-Valent Iron: Field, Laboratory and Modeling Studies. Water Research, 37, 1417-1425, 2003.
Nickson, R., McArthur, J, Burgess, W. Arsenic Poisoning in Bangladesh Groundwater. Nature, 395, 338-348, 1998.
Pandey, P. K, Yadav, D., Bhui, A. Arsenic Contamination of the Environment. A New Perspective from Central-East India. Environ. Int., 28, 235-245, 2002.
Parkinson, Gordon, "Crystallisation Program," pp. 74-83, 2004.
PCT International Search Report from PCT/US04/27877, dated Nov. 10, 2005.
PCT Written Opinion of the International Searching Authority from PCT/US04/27877, dated Nov. 10, 2005.
Ramana, et al., Removing Selenium(IV) and Arsenic (V) Oxyanions with Tailored Chelating Polymers, Journal of Environmental Engineering, vol. 118, No. 5, Sep./Oct. 1992, pp. 755-775.
Roberts, L. C., Hug, S. J., Ruettimann, T., Billah, M., Khan, A. W., Rahman, M. T. Arsenic Removal with Iron (II) and Iron (III) in Waters with High Silicate and Phosphate Concentrations. Environmental Science and Technology, 38, 307-315, 2004.
Schwertmann, U., Cornell, R. M. Iron Oxides in the Laboratory, 2nd Ed., Wiley-VCH, Weinheim, Germany, 5-18, 2000.
SenGupta, A.K., Greenleaf, J. E. Arsenic in Subsurface Water: Its Chemistry and Removal by Engineered Processes. Environmental Separation of Heavy Metals, Edited by A. K. SenGupta, 265-306, Lewis Publishers, CRC Press, Boca Raton, FL, 2002.
Sun, X., Doner, H. E. Adsorption and Oxidation of Arsenite on Geothite. Soil Science, 163(4), 278-287, 1998.
Thieme, Trevor, "Newsfiles, Like a Cup of Arsenic? Oh, You've Already Got Some" Popular Science, http://www.popsci.com/popsci/science/article/0,12543,195220,00.html, 2003, 2 pages.
Tokunaga, S., Wasay, S. A., Park, S. Removal of Arsenic(V) Ion from Aqueous Solutions by Lanthanum Compounds. Water Science and Technology, 35(7), 71-78, 1997.
Wasay, S. A., Haron, J., Uchiumi, A., Tokunaga, S. Removal of Arsenite Ions from Aqueous Solution by Basic Yttrium Carbonate. Water Research, 30(5), 1143-1148, 1996.
PCT International Search Report and Written Opinion of the International Searching Authority for PCT/US11/26519, dated May 10, 2011, 9 pages.
PCT International Preliminary Report on Patentability from PCT/US04/27877, issued Mar. 6, 2006.
PCT Search Report for PCT/US2006/032374, mailed Apr. 10, 2007.
Written Opinion for PCT/US2006/032374, mailed Apr. 10, 2007.
PCT International Preliminary Report on Patentability for PCT/US2006/032374, issued Feb. 26, 2008.

* cited by examiner

METHODS OF PRODUCING ADSORPTION MEDIA INCLUDING A METAL OXIDE

GOVERNMENT RIGHTS

This invention was made with government support under Contract Number DE-AC07-05ID14517 awarded by the United States Department of Energy. The government has certain rights in the invention.

CROSS-REFERENCE TO RELATED APPLICATIONS

This application is related to U.S. patent application Ser. No. 11/941,428, filed Nov. 16, 2007, now U.S. Pat. No. 8,043,586, issued Oct. 25, 2011, which is a divisional of U.S. Pat. No. 7,368,412, filed Sep. 4, 2003, and is also related to U.S. patent application Ser. No. 11/210,577, filed Aug. 23, 2005, now U.S. Pat. No. 7,807,606, issued Oct. 5, 2010, the disclosure of each of which is incorporated herein in its entirety by reference. The subject matter of this application is also related to U.S. patent application Ser. No. 12/858,398, filed Aug. 17, 2010, now U.S. Pat. No. 7,947,861, issued May 24, 2011.

TECHNICAL FIELD

Embodiments of the present invention relate to methods of producing a metal oxide and a method of producing an adsorption medium including the same. More specifically, embodiments of the present invention relate to methods of producing a metal oxide having a reduced water content and a method of producing an adsorption medium including the metal oxide.

BACKGROUND

Water supplies contaminated with arsenic (As) are a major health and environmental concern in the United States and worldwide. Arsenic is a naturally occurring element that is present in rocks or soils. Over time, the arsenic leaches from the rocks or soils into groundwater, surface water, wells, or other sources of drinking water. This arsenic contamination is referred to as indigenous arsenic contamination. Arsenic-contaminated solutions are also produced in a variety of industries, such as mining, agriculture, semiconductor, or petroleum industries. These arsenic-contaminated solutions include process solutions and waste streams. The ingestion of significant amounts of arsenic can lead to disastrous effects on human health, which has become well documented in parts of the Indian subcontinent, where tube wells have replaced surface water as the primary drinking water source. Many of the worst cases of arsenic poisoning have occurred in the West Bengal area, where As concentrations in the drinking water can exceed 300 parts per billion (ppb). Health problems due to the consumption of As-contaminated water currently affect over 70 million people in Bangladesh. However, the deleterious consequences of lesser concentrations of As in drinking water are becoming evident in other parts of the world as well, e.g., Mexico, Argentina, and Taiwan. In September 2001, a National Academy of Science study concluded that even trace amounts of arsenic can cause bladder and lung cancer.

Arsenic is present in nature in valence states or oxidation states of +3 and +5. In water supplies, arsenic contaminants typically exist as As(III) compounds and/or As(V) compounds. The As(III) compounds include As(III) oxyanions or oxyacids, such as $H_3AsO_3$ or $H_2AsO_3^{1-}$, depending on the pH of the water supply. The As(V) compounds include As(V) oxyanions, such as $H_2AsO_4^-$ or $HAsO_4^{2-}$, or oxyacids, such as $H_3AsO_4$, depending on the pH of the water supply. Under atmospheric conditions or an oxidizing environment, As(V) compounds are predominantly present in water supplies. As(III) compounds are also known as arsenites, while As(V) compounds are known as arsenates.

Numerous techniques for removing arsenic from water supplies have been proposed and developed. For instance, arsenic removal has utilized anion exchange, cation exchange, polymeric anion exchange, liquid-liquid extraction, activated alumina sorption, coprecipitation, sorption by iron oxide-coated sand particles, enhanced coagulation with alum or ferric chloride dosage, ferric chloride coagulation followed by microfiltration, pressurized granulated iron particles, iron oxide doped alginate, manganese dioxide-coated sand, polymeric ligand exchange, and zero-valent iron. These techniques primarily rely on ion exchange and Lewis acid-base interactions to remove the arsenic.

In U.S. Pat. No. 5,591,346 to Etzel et al., an iron(III)-complexed cation exchange resin is disclosed for removing arsenic from wastewater or drinking water. The iron(III)-complexed cation exchange resin is formed by loading a strong acid cation exchange resin with iron ions. The cation exchange resin is purchased commercially and then loaded with the iron ions. When the iron(III)-complexed cation exchange resin is contacted with a stream of wastewater or drinking water, the iron ions react with arsenate anions to form an iron arsenate salt complex. The iron arsenate salt complex is immobilized on the cation exchange resin, removing the arsenic from the wastewater or drinking water.

While many techniques for removing arsenic from water supplies are known, conventional ion exchange resins do not provide the specificity to economically remove low concentrations of arsenic. Since many water supplies in the United States, such as groundwater, surface water, or wells, have low concentrations of arsenic, these techniques are not effective to remove the arsenic. In addition, many of these techniques are not selective for arsenic over other ions. To improve the selectively of ion exchange resins for arsenic, granules of metal oxides or metal hydroxides, such as ferric hydroxide, have also been investigated. While these metal oxide or metal hydroxide granules are more selective for arsenic, they have a low porosity and, therefore, have a low capacity for arsenic and poor kinetic properties. To improve the performance of ferric hydroxide, ferric hydroxide has been incorporated into organic polymers. For instance, in "Arsenic Removal Using a Polymeric/Inorganic Hybrid Sorbent," DeMarco et al., *Water Research* 37 (2003) pp. 164-176, a hydrated iron oxide is dispersed into a polymeric, cation exchange bead. The polymeric, cation exchange beads are commercially available and include a polystyrene matrix having sulfonic acid functional groups. A sorbent is prepared by loading Fe(III) onto the sulfonic acid sites on the cation exchange beads. The Fe(III) is then desorbed and Fe(III) hydroxides are simultaneously precipitated within the cation exchange beads using a strong alkaline solution, encapsulating the hydrated iron oxides within the cation exchange beads. The capacity of the sorbent for arsenic is limited by the total number of sulfonic acid sites on the cation exchange beads. In this sorbent, the hydrated iron oxide is loaded at approximately 0.9% to 1.2% by mass. In other words, only 9 mg of iron per gram of sorbent is loaded at saturation.

U.S. Pat. No. 7,368,412 to Tranter et al. ("the '412 patent") and U.S. Patent Application Publication No. 20050288181 to Tranter et al. ("the '181 application") describe adsorption media that are used to remove a constituent, such as arsenic, selenium, or antimony, from a feed stream. In one embodiment, the adsorption media include polyacrylonitrile (PAN) and a metal hydroxide or metal oxide as an active component. The active component is ferric hydroxide or hydrated iron oxide (HIO). To synthesize HIO particles, an iron(III) salt is dissolved in water to form a solution. The solution is then titrated to a pH of approximately 6.5 with an aqueous caustic solution to precipitate brown HIO particles, which are recovered by filtration and dried. Since water is used as the reaction medium, the resulting HIO particles include greater than or equal to approximately 70% by mass of water. The HIO particles are also washed with water to remove metal salts produced during the synthesis. However, before the HIO particles are incorporated into the PAN, the water is removed. Drying techniques capable of removing such large amounts of water are expensive due to the large capital and operational costs. In addition, the energy requirements for the drying techniques are expected to be expensive. After drying, the HIO particles are suspended in dimethylsulfoxide (DMSO) and the resulting suspension is combined with PAN, which is soluble in DMSO. The PAN/HIO solution/suspension is sprayed into an aqueous quenching bath, producing the adsorption media in the form of beads that contain HIO and PAN. The beads are removed from the quenching bath, rinsed with water, and dried before use. Multiple washes are conducted to remove residual DMSO and metal salts produced during the formation of the adsorption media. If the washes are not conducted, the surface area and efficiency of the adsorption media are reduced.

While the '412 patent and the '181 application describe effective methods of forming metal oxides, it would be desirable to form metal oxides having a relatively lower water content.

BRIEF SUMMARY

An embodiment of the present invention comprises a method of producing a metal oxide comprising dissolving a metal salt in a reaction solvent to form a metal salt/reaction solvent solution. The metal salt in the metal salt/reaction solvent solution is converted to a metal oxide and a caustic solution is added to achieve a pH in the metal salt/reaction solvent solution of less than approximately 7.0. The metal oxide is precipitated and recovered.

Another embodiment of the present invention comprises introducing a gaseous oxygen source into a metal salt/reaction solvent solution and adding a non-aqueous caustic solution to the metal salt/reaction solvent solution to achieve a pH in the metal salt/reaction solvent solution of between approximately 6.5 and approximately 6.9. Particles of a metal oxide are precipitated and recovered.

Yet another embodiment of the present invention comprises a method of producing particles of hydrous iron oxide comprising dissolving an iron(III) salt in an reaction solvent to form an iron(III) salt/reaction solvent solution. Oxygen gas or air is flowed through the iron(III) salt/reaction solvent solution to convert the iron(III) salt to hydrous iron oxide. The pH of the iron(III) salt/reaction solvent solution is adjusted to between 6.5 and 6.9 to precipitate the hydrous iron oxide, which is subsequently recovered.

In still yet another embodiment of the present invention, a method of producing adsorption media comprises dissolving a metal salt in an reaction solvent to form a metal salt/reaction solvent solution. The metal salt in the metal salt/reaction solvent solution is converted to a metal oxide. The pH of the metal oxide/reaction solvent solution is titrated to precipitate particles of the metal oxide. The particles of the metal oxide are suspended in a solvent to form a metal oxide suspension, into which a matrix material is dissolved to form a matrix-metal oxide suspension. The matrix-metal oxide suspension is deposited into an aqueous solution to form the adsorption media.

Yet another embodiment of the present invention comprises a precursor of an active component comprising particles of a metal oxide, the particles comprising less than approximately 0.5% water.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION

Figure 1:
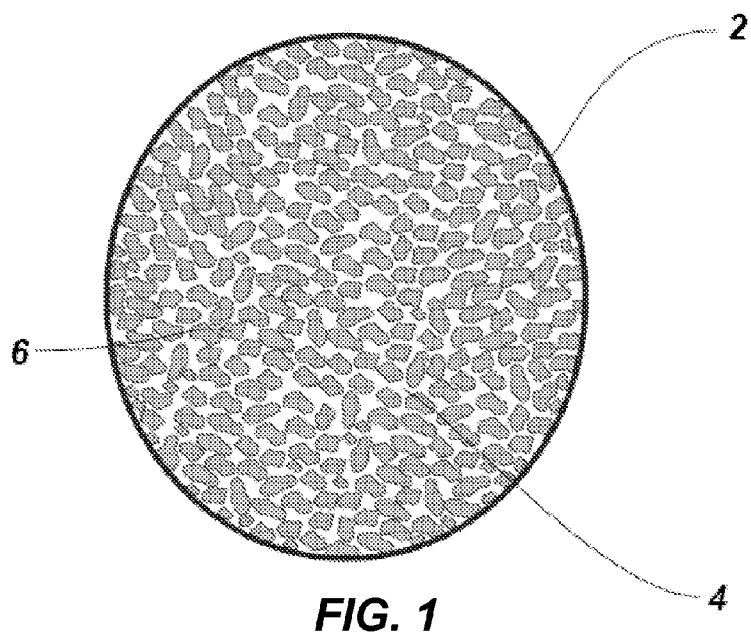
FIG. 1 is a schematic illustration of an embodiment of an adsorption medium of the present invention.

Methods of forming a metal oxide and methods of forming an adsorption medium including the metal oxide as an active component are disclosed. The adsorption medium 2 may be used to remove at least one constituent from a feed stream. The adsorption medium 2 includes a matrix 4 and at least one active component 6, as shown in FIG. 1. The at least one active component 6 may be dispersed within the pores of the matrix 4 and be affixed or adsorbed to the matrix 4. The at least one active component 6 may be synthesized prior to the formation of the adsorption medium 2, enabling increased loading of the at least one active component 6. The active component 6 may be synthesized in a non-aqueous reaction medium, producing a precursor of the active component 6 having a water content of less than approximately 0.5% by weight.

As used herein, the term "precursor of the active component 6" means and includes a metal oxide capable of complexing with the constituent of the field stream and that is produced by removing a reaction solvent from the metal oxide. As used herein, the term "water content" means and includes water present in the reaction solvent used to produce the precursor of the active component 6. The term "water content" excludes water bound to a metal of the precursor of the active component 6 or crystallized with the metal of the precursor of the active component 6 (i.e., excludes a hydrate or a water of hydration of the precursor of the active component 6), which may be present depending on the compound used as the active component 6.

The water content of the precursor of the active component 6 produced by the method of the present invention may be lower than that of a precursor of an active component produced by conventional techniques. If the reaction solvent is not sufficiently volatile to evaporate under ambient conditions, the reaction solvent may be removed from the precursor of the active component 6, producing the active component 6.

The reaction solvent may have a relatively high vapor pressure such that the reaction solvent may be easily removed when the active component 6 is to be recovered. The active component 6 of the present invention may be directly incorporated into the adsorption media 2 without washing, which eliminates multiple washing acts from the total number of acts used to produce the adsorption media 2.

The illustrations presented herein are not meant to be actual views of any particular adsorption medium or device including the adsorption media, but are merely idealized representations which are employed to describe the present invention. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the invention and such term is used in preference to the more restrictive term "is" so as to avoid any implication that other, compatible materials, structures, features and methods usable in combination therewith should or must be, excluded.

The active component 6 may be selected for its ability to remove the constituent from the feed stream. The feed stream may be, for example, a drinking water source or an industrial water stream having at least one constituent that is to be removed. The drinking water source may include groundwater, surface water, well water, or other drinking water sources. The industrial water stream may be a process solution or a waste stream generated by an industrial process, such as a stream generated by the mining, agriculture, semiconductor, or petroleum industry. The at least one constituent to be removed may be an undesirable component of the feed stream, such as a component that produces health risks when ingested by humans or other mammals. By way of non-limiting example, the at least one constituent may include, but is not limited to, an arsenic compound, a selenium compound, an antimony compound, a technetium compound, or combinations thereof.

If the constituent to be removed is an arsenic compound, a selenium compound, an antimony compound, or a technetium compound, the active component 6 may be a metal hydroxide, a metal oxide, or combinations thereof that is incorporated, or physically trapped, in the matrix 4. For simplicity and convenience, the term "metal oxide," when used in reference to the active component 6, means and includes a metal hydroxide, a metal oxide, or combinations thereof. The metal oxide may be a hydroxide or an oxide of a divalent, trivalent, or tetravalent metal, such as a hydroxide or an oxide of a transition metal, a lanthanide or rare earth metal, a Group III metal, a Group IV metal, or a Group V metal. For instance, the metal oxide may be a hydroxide or an oxide of iron, zirconium, lanthanum, cerium, titanium, aluminum, tin, silver, zinc, mercury, bismuth, copper, antimony, tungsten, or molybdenum. By way of non-limiting example, the metal oxide may be an iron hydrite, such as a HIO (also known as hydrous ferric oxide, hydrous ferric oxyhydroxide, or ferrihydrite) compound with varying degrees of structural order, generally named according to the number of broad X-ray peaks they exhibit, e.g., two-line and six-line ferrihydrite. In one embodiment, the active component 6 is a HIO compound having a ratio of Fe:H:O of about 1.25:2.25:3.00. Proposed formulas of the HIO compound include $5Fe_2O_3.9H_2O$ or $Fe_5HO_8.4H_2O$. The high surface area of HIO compounds is believed to be due to the fact that they all exhibit relatively low degrees of structural order, with the two-line variety being the most amorphous and the six-line variety being slightly more crystalline. Although the structures of HIO compounds are not fully understood, the low degree of crystallinity is generally attributed to vacant Fe sites and to the replacement of some oxygen by $H_2O$ and/or OH.

The active component 6 may also include a combination of metal hydroxides, a combination of metal oxides, or a combination of metal hydroxides and metal oxides that are incorporated into the matrix 4. By way of non-limiting example, a combination of ferric hydroxide and ferrihydrite, or ferric hydroxide, lanthanum hydroxide, and titanium hydroxide may be used as the active component 6. By utilizing the combination of metal hydroxides and/or combination of metal oxides, the adsorption media 2 may be tailored to remove specific oxidation states of arsenic, selenium, antimony, or technetium, depending on which constituents are present in the feed stream. By way of non-limiting example, one combination of active component 6 may be more specific to remove As(III) compounds, while a second combination of active component 6 may have increased specificity for As(V) compounds. The combination of active component 6 may also be tailored to selectively remove constituents in the presence of other potentially competing anions, such as phosphates or nitrates.

The precursor of the active component 6 may be synthesized using an organic solvent as the reaction solvent, resulting in a reduced water content in the precursor of the active component 6. Utilizing the organic solvent as the reaction solvent may result in a reduction in water content in the precursor of the active component 6 by from approximately 25% to approximately 100%. The reaction solvent may be substantially free of water, such as including less than approximately 1% of water.

To produce the metal oxide to be used as the active component 6, a salt of the desired metal may be dissolved in the reaction solvent to form a metal salt/reaction solvent solution. As used herein, the term "solution" is used to collectively refer to a solution or a suspension. Since a person of ordinary skill in the art will recognize whether a particular instance of the term describes a solution, a suspension, or a mixture thereof from the context, for the purposes of readability and claiming the invention, the term "solution" means a solution, a suspension, or a mixture of a solution and a suspension. The metal of the metal salt may be a divalent, trivalent, or tetravalent metal, such as a transition metal, a lanthanide or rare earth metal, a Group III metal, a Group IV metal, or a Group V metal. For instance, the metal may be iron, zirconium, lanthanum, cerium, titanium, aluminum, tin, silver, zinc, mercury, bismuth, copper, antimony, tungsten, or molybdenum. The metal salt may be a chloride, an oxychloride, a sulfate, a nitrate, or an acetate of one of the above-mentioned metals. In one embodiment, the metal is iron, such as iron(III), and the metal salt is an iron(III) chloride or an iron(III) nitrate, such as $Fe_3(NO_3)_3.9H_2O$ or $Fe_3Cl_3.6H_2O$. The metal salt may be dissolved in the reaction solvent at a concentration of up to approximately 400 g/L. However, a lower concentration of the metal salt may be used depending on the desired concentration of the metal salt/reaction solvent solution. The reaction solvent may be a polar organic solvent in which the metal salt is sufficiently soluble at ambient temperature to achieve the desired loading of the metal oxide in the adsorption media 2. However, the resulting metal oxide may be substantially insoluble in a solvent used to produce the adsorption media 2. The reaction solvent may also have a relatively high vapor pressure such that the reaction solvent may be easily removed when the active component 6 is to be recovered. By way of non-limiting example, the reaction solvent may be DMSO, methanol, ethanol, propanol, acetone, or combinations thereof. If the metal salt is not sufficiently soluble in the reaction solvent at ambient temperature (approximately 20° C. to approximately 25° C.), the metal salt/reaction solvent solution may be heated to dissolve the metal salt. By way of non-limiting example, if the reaction solvent is DMSO and the metal salt is an iron chloride or an iron nitrate, the DMSO may be heated to approximately 60° C. to dissolve the iron chloride or iron nitrate. However, if the reaction solvent is methanol, iron chloride or iron nitrate may dissolve without heating.

After forming the metal salt/reaction solvent solution, the metal salt may be converted to a metal oxide, producing a solution of the metal oxide in the reaction solvent. The metal oxide produced by the reaction of the metal salt corresponds to the active component 6 ultimately present in the adsorption medium 2. The metal oxide may be formed by introducing a gaseous oxygen source and a caustic agent into the metal salt/reaction solvent solution, and reacting the metal salt with at least one of the gaseous oxygen source and the caustic agent. Without being bound to any particular theory, the metal oxide may be formed by a reaction between the metal salt and the gaseous oxygen source, by a reaction between the metal salt and the caustic agent, or by a reaction between the metal salt, the gaseous oxygen source, and the caustic agent. The gaseous oxygen source may be bubbled through the metal salt/reaction solvent solution. The gaseous oxygen source may be oxygen gas ($O_2$), air, a nitrogen oxide ($NO_x$), carbon dioxide ($CO_2$), or combinations thereof. To provide sufficient oxygen for the reaction, the gaseous oxygen source may be present at least at a stoichiometric amount relative to the metal salt. However, to ensure complete reaction of the metal salt, an excess of the gaseous oxygen source may be used. The gaseous oxygen source may be bubbled into the metal salt/reaction solvent solution throughout the duration of the reaction. Utilizing an organic solvent as the reaction solvent for the reaction, rather than water, provides a more discrete transition between the metal salt and the metal oxide. As the reaction proceeds, the metal oxide/reaction solvent solution becomes more viscous. In contrast, when water is used as the reaction solvent, the transition between the metal salt and the metal oxide is less noticeable.

The metal oxide/reaction solvent solution may be titrated to a pH of from approximately 6.5 to less than approximately 7.0 using a caustic solution, such as a non-aqueous caustic solution. The non-aqueous caustic solution may be substantially free of water, such as including less than approximately 0.5% water. The non-aqueous caustic solution may include the caustic agent dissolved in an organic solvent, such as DMSO, methanol, ethanol, propanol, or combinations thereof. The organic solvent may be substantially free of water, such as including less than approximately 0.5% water. The caustic agent may be an oxide or hydroxide of a metal, such as sodium hydroxide or potassium hydroxide, or an organic base, such as butyl lithium, lithium diisopropylamide, lithium diethylamide, sodium amide, sodium hydride, lithium bis(trimethylsilyl)amide, pyridine, methyl amine, imidazole, benzimidazole, or histidine. The concentration of the caustic agent in the non-aqueous caustic solution may be from approximately 0.1 M to approximately 8 M. In one embodiment, the non-aqueous caustic solution is 6 M potassium hydroxide in methanol. The metal oxide/reaction solvent solution may be constantly stirred during the addition of the non-aqueous caustic solution. The non-aqueous caustic solution may be added slowly to prevent the occurrence of localized concentrations of high pH in the metal oxide/reaction solvent solution. The addition of the non-aqueous caustic solution may cause a fine precipitate of the metal oxide to form, such as in the form of particles.

The reaction solvent may be removed, such as by evaporation or filtration, to recover the metal oxide, which corresponds to the precursor of the active component 6. The precursor of the active component 6 may be substantially free of water, such as including less than approximately 0.5% water. As a consequence, the precursor of the active component 6 may be easily handled, such as during subsequent acts to produce the active component 6. In contrast, the precursor of the metal oxide produced as described in the '181 application is sticky and may be hard to handle at a similar point in processing. The precursor of the active component 6 formed by the method of the present invention may also have a reduced water content compared to the precursor of the metal oxide produced as described in the '181 application. The precursor of the active component 6 formed by the method of the present invention may have from approximately 25% to approximately 100% less water than that formed by the method described in the '181 application. As previously described, the water content of the precursor of the active component 6 does not include waters of hydration, which may be present depending on the metal oxide formed as the active component 6.

To remove residual reaction solvent, the precursor of the active component 6 may be dried at ambient temperature (from approximately 20° C. to approximately 25° C.) until a dry aggregate of the active component 6 is formed. If the reaction solvent is sufficiently volatile, the reaction solvent may be removed by evaporation under ambient conditions. The dry aggregate is substantially free of the reaction solvent but may include waters of hydration. Depending on the reaction solvent used, a higher drying temperature may also be used. By way of non-limiting example, if DMSO is used as the reaction solvent, a temperature of up to approximately 50° C. may be used to remove the residual reaction solvent. The dry aggregate may be ground or milled to a desired size, such as a particle size of less than approximately 150 µm, before incorporation into the adsorption media 2. The active component 6 formed by the method of the present invention may be easily milled or ground. While the dry aggregate may be ground or milled, the dry aggregate may also be incorporated into the adsorption media 2 without additional processing (i.e., by hand) because the aggregate is easily broken and fractured. Any large aggregate of the active component 6 may be broken up before incorporation into the adsorption media 2. Once the residual reaction solvent is removed, the active component 6 may be easily handled. In contrast, the active component produced as described in the '181 application may be substantially less friable and, therefore, milling or grinding is more difficult. The active component 6 formed by the method of the present invention has a surface area of from approximately 250 $m^2/g$ to approximately 350 $m^2/g$ as measured by the Brunauer-Emmett-Teller (BET) method, which is comparable to the surface area of the active component 6 produced as described in the '181 application.

By way of non-limiting example, if the active component 6 to be formed is HIO, an iron(III) salt, such as iron(III) chloride or iron(III) nitrate, may be dissolved in DMSO or methanol to produce an iron(III) salt/reaction solvent solution. The iron(III) salt may be converted to an iron oxide by introducing $O_2$ or air into the iron salt/reaction solvent solution, producing an iron oxide/reaction solvent solution. The iron oxide/reaction solvent solution may be titrated with a solution of potassium hydroxide in methanol, until the pH of the iron oxide/reaction solvent solution is between approximately 6.5 and approximately 6.9. The potassium hydroxide/methanol solution may be added to the iron oxide/reaction solvent solution with constant stirring, producing a brown precipitate of HIO. The methanol may be removed, such as by evaporation, producing HIO particles as the active component 6. The HIO particles may be substantially free of methanol but may include waters of hydration.

By utilizing a non-aqueous reaction solvent and a non-aqueous caustic solution, the precursor of the active component 6 may have a lower water content than the precursor of the active component produced as described in the '181 application, which reduces the amount of drying needed before incorporating the active component 6 into the adsorption media 2. The active component 6 formed as described above may be incorporated into the adsorption media 2 without first washing or otherwise processing the active component 6. After the adsorption media 2 is formed, additional water washes are conducted to remove residual solvent and metal salts. In contrast, HIO particles produced as described in the '181 application are dried, washed with multiple volumes of water, and dried again before incorporating the HIO particles into the adsorption media 2, which are washed again after forming the adsorption media 2.

Figure 2:
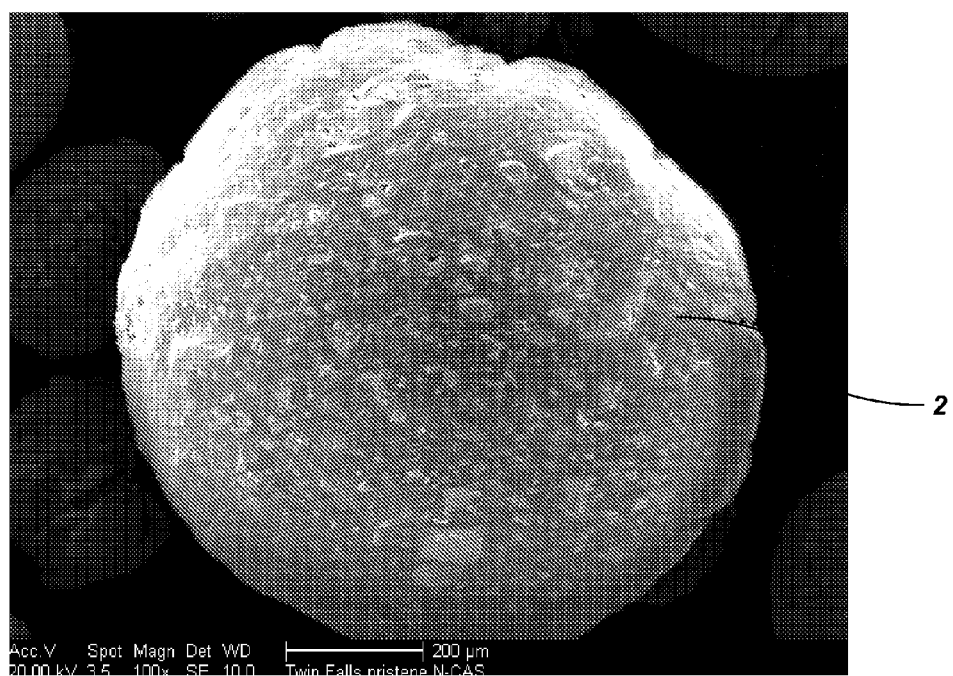
FIG. 2 is a scanning electron micrograph (SEM) of an embodiment of an adsorption medium of the present invention (100×)
Figure 3:
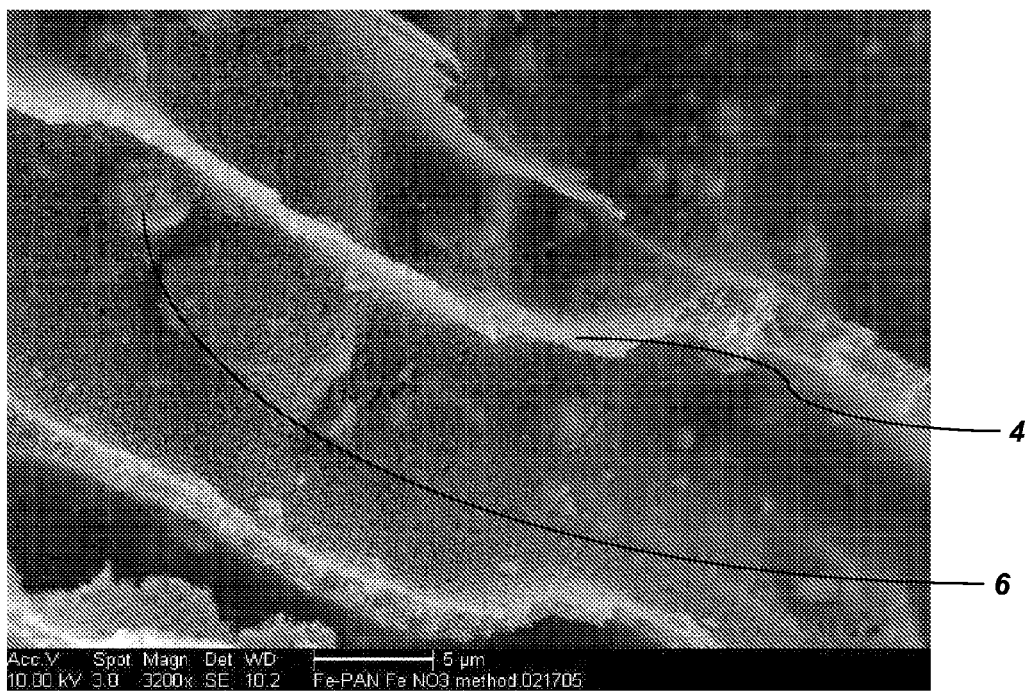
FIG. 3 is an SEM of an inner section of the adsorption medium of FIG. 2 (3200×)
Figure 4:
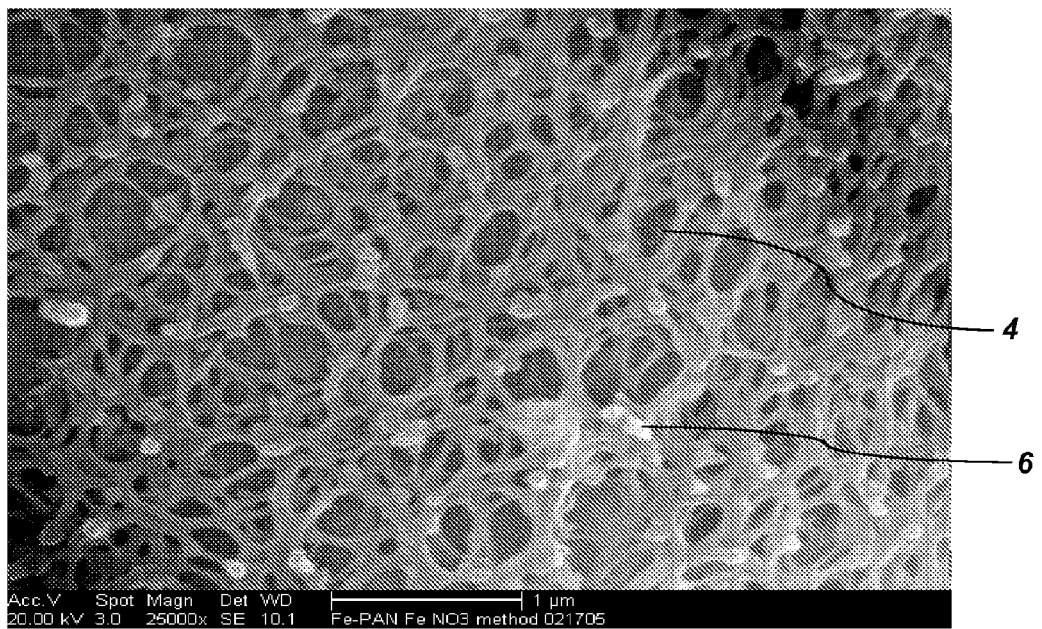
FIG. 4 is an SEM of the adsorption medium of FIG. 2 showing aggregates of HIO within a PAN matrix (25000×)

The particles of the active component 6 may then be incorporated into the adsorption media 2 as described in the '181 application. The active component 6 may be combined with the matrix 4 to disperse the active component 6 within the pores of the matrix 4 or to affix or adsorb the active component 6 to the matrix 4, as shown in FIGS. 2-4. FIG. 2 is an SEM of a PAN-HIO adsorption medium 2 at 100× magnification. The matrix 4 may be an inert substrate, such as PAN, polystyrene, or other matrix compound known in the art. As used herein, the term "PAN" refers to an acrylonitrile homopolymer or a copolymer containing at least about 40% acrylonitrile units. For instance, the PAN may be an acrylonitrile polymer or a copolymer having a ratio of at least about 40% acrylonitrile molecules to total molecules. The acrylonitrile homopolymer may include crystalline, quasicrystalline, and/or amorphous phases. The matrix 4 may be constituted to enable formation thereof into a plurality of small, porous, particles, which are also referred to herein as beads. While various examples herein describe using PAN as the matrix 4, a person of ordinary skill in the art, using the guidance of the present invention, may utilize another polymer or combination of polymers as the matrix 4. By way of non-limiting example, additional organic or inorganic polymers having these properties, such as polystyrene, may be used as the matrix 4 provided that the polymer is soluble in a solvent used to produce the adsorption media 2 and is compatible with the at least one active component 6. FIG. 3 is an SEM of the PAN-HIO adsorption medium 2 of FIG. 2 at 3200× magnification and shows the active component 6 (HIO) and macroporous channels in the matrix 4. FIG. 4 is an SEM of the PAN-HIO adsorption medium 2 of FIG. 2 at 32000× magnification and shows the active component 6 (HIO) within the matrix 4 (PAN).

To produce the adsorption media 2 having the metal oxide as the active component 6, the metal oxide may be dissolved or suspended in a solvent to form a metal oxide solution. As described previously, the term "solution" is used to collectively refer to a solution or a suspension. Since a person of ordinary skill in the art will recognize whether a particular instance of the term describes a solution, a suspension, or a mixture thereof from the context, for the purposes of readability and claiming the invention, the term "solution" means a solution, a suspension, or a mixture of a solution and a suspension. The solvent may be a mineral or inorganic acid or another organic solvent in which the matrix 4 is substantially soluble and the active component 6 is substantially insoluble. By way of non-limiting example, the solvent may be an aprotic polar organic solvent, such as dimethylformamide, dimethylacetamide, DMSO, sulfolane, ethylene carbonate, or N-methylpyrrolidone; concentrated nitric acid ($HNO_3$); an acid, such as concentrated sulfuric acid; or a concentrated aqueous solution of certain inorganic salts, such as lithium bromide, sodium thiocyanate, or zinc chloride. In one embodiment, the solvent is DMSO and the metal oxide is HIO, which is suspended in the DMSO. The amount of metal oxide present in the metal oxide solution may depend on the desired loading of metal oxide in the adsorption media 2.

The material of the matrix 4 may be dissolved in the metal oxide solution to form a matrix-metal oxide solution in which the metal oxide may form particulates in the matrix-metal oxide solution. The material of the matrix 4 may be dissolved in the metal oxide solution at from approximately 3% by weight ("wt %") to approximately 5 wt %. In one embodiment, the material of the matrix 4 is PAN. The material of the matrix 4 may be added to the metal oxide solution with slight agitation and heating to dissolve the material of the matrix 4. While the previous description describes dissolving or suspending the metal oxide in the solvent and then adding the material of the matrix 4 to the metal oxide solution, the material of the matrix 4 may first be added to the solvent, followed by addition of the metal oxide to form the matrix-metal oxide solution.

Various techniques may be used to produce the adsorption media 2 from the matrix-metal oxide solution. Solid beads of the adsorption media 2 may be formed by spraying the matrix-metal oxide solution through an air/nozzle device into a quenching bath including water. The air/nozzle device may be a conventional spray nozzle that is adjusted to form droplets of a desired size. The droplets solidify into beads upon contact with the quenching bath, for example, by diluting the solvent. The air/nozzle device may also utilize air, or an inert gas (e.g., nitrogen) to accelerate formation or release of the droplets. The droplet size, and/or bead size, may be adjusted to achieve a desired range, for example, by using the appropriate diameter nozzle and adjusting the air or nitrogen flow rate. By way of non-limiting example, the distance from the nozzle to the quenching bath may be adjusted to allow the droplets to assume a substantially spherical shape prior to entering the quenching bath. The water of the quenching bath may dilute, remove, and/or neutralize the solvent in the droplets, causing the material of the matrix 4 from the matrix-metal oxide solution to become insoluble and solidify. As the material of the matrix 4 solidifies, the metal oxide becomes incorporated therein. The water in the quenching bath may be deionized water. The water may be constantly stirred while the matrix-metal oxide solution is sprayed into it.

The active component 6 may be homogenously dispersed within the matrix 4, as shown in FIG. 1. The metal loading of the adsorption media 2 may be up to approximately fifty times the metal loading achieved with conventional ion exchange resins. With the increased loading, the adsorption media 2 may have an increased capacity for the constituents in the feed stream compared to the capacity of conventional ion exchange resins. The adsorption media 2 may include from approximately 10 wt % to approximately 90 wt % of the metal in the form of an elemental metal, metal hydroxide and/or metal oxide. The adsorption media 2 may include at least approximately 50 wt % of the metal in the form of the elemental metal, metal hydroxide, and/or metal oxide, such as approximately 85 wt % of the metal in the form of the elemental metal, metal hydroxide, and/or metal oxide. In one embodiment, if HIO is used as the active component 6, the adsorption media 2 may include at least 50 wt % iron in the form of Fe(III) and/or FeO(OH). In one embodiment, the adsorption media 2 may include approximately 85% HIO and approximately 15% PAN wt %.

The remainder of the adsorption media 2 may include the matrix 4. By way of non-limiting example, if PAN is used as the matrix 4, the adsorption media 2 may include from approximately 10 wt % to approximately 90 wt % of the PAN. If the adsorption media 2 include a mixture of metals, the matrix 4 may be present at from approximately 15 wt % to approximately 20 wt %. The remainder of the adsorption media 2 may include from approximately 80 wt % to approximately 85% of the metal in the form of elemental metal, metal hydroxide, and/or metal oxide.

A rate at which the metal oxide precipitates from the matrix-metal oxide solution may affect the shape and metal loading of the adsorption media 2 that are formed. If the metal oxide precipitates quickly, the adsorption media 2 may not be sufficiently spherical, reducing their surface area. However, loading of the metal oxide on the adsorption media 2 may be increased. In contrast, if the metal oxide precipitates slowly, the adsorption media 2 form as spherical, solid beads. However, these adsorption media 2 may have a decreased loading of the metal oxide.

The adsorption media 2 having the active component 6 incorporated into the matrix 4 may be removed from the quenching bath, rinsed with water, and dried. Washing the adsorption media 2 with water may remove residual organic solvent, such as DMSO, and metal salts, such as sodium chloride or potassium chloride. After the active component 6 has been incorporated into the matrix 4, water washes of the adsorption media 2 may be conducted without substantially affecting properties of the adsorption media 2. Since the organic solvent (reaction solvent or solvent used to form the adsorption media 2) and metal salts are removed by the water wash, the method of the present invention may eliminate a method act compared to the process described in the '181 application, in which the metal oxide particles are washed after the synthesis of the metal oxide particles and again after the metal oxide particles are incorporated into the adsorption media 2. The adsorption media 2 may, alternatively, be stored until needed without washing. The adsorption media 2 may then be loaded into a separation device, such as a chromatography column or a cartridge, and back flushed with water to remove the residual salts and organic solvent. The adsorption media 2 may, optionally, be screened to achieve a desired size fraction of the adsorption media 2. The adsorption media 2, such as in the form of solid beads, may have the metal oxide incorporated into, or physically trapped in, the matrix 4.

The adsorption media 2 including the active component 6 formed by the method of the present invention may have a surface area of from approximately 250 m$^2$/g to approximately 300 m$^2$/g as measured by the BET method, which is comparable to the surface area of the metal oxide particles produced as described in the '181 application. The enhanced surface area and porosity provides the adsorption media 2 with an increased removal capacity for the constituents compared to conventional ion exchange resins. In addition, the adsorption media 2 may be selective for certain constituents, such as arsenic, in the presence of other potentially competing anions, such as phosphate or nitrate.

The adsorption media 2 may also be impregnated onto a support, such as a filter, disc, or membrane. The support may be a fibrous material, such as a glass wool fiber. A pressure differential, such as a vacuum, may be applied on one side of the filter. The matrix-metal oxide solution may be applied to the high pressure side of the pressure differential. The pressure differential causes the matrix-metal oxide solution to flow into, and impregnate, the filter. The impregnated filter may be immersed in a water bath to dilute, remove, or otherwise neutralize the solvent. Diluting the solvent may cause the matrix 4 to solidify in the support. For instance, the matrix 4 may solidify, forming a filter disk or a filter medium that includes the matrix 4 and the metal oxide. In other words, the impregnated support may include the metal oxide incorporated into, or physically trapped in the matrix 4. The adsorption media 2 may also be used in a cartridge-type treatment device or apparatus.

Figure 5:
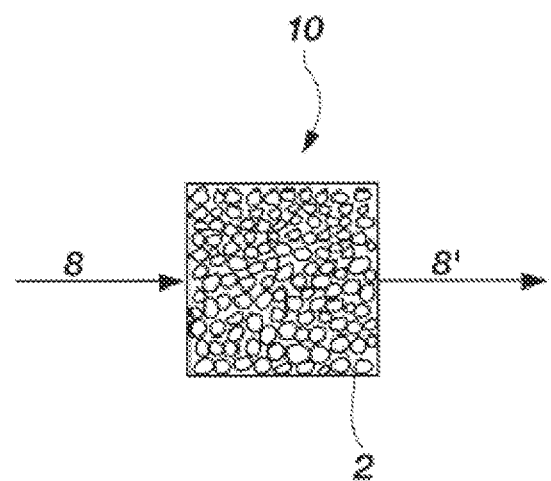
FIG. 5 illustrates the adsorption media during process conditions.

The adsorption media 2 produced by the method of the present invention may be used to remove oxyanion or oxyacid constituents of arsenic, selenium, antimony, or technetium from the feed stream 8, as illustrated in FIG. 5 and as described in more detail in the '181 application. The feed stream 8 may be passed through the adsorption medium 2 to remove the constituent, such as arsenic, or constituents before the feed stream 8 is distributed to users as potable water. The adsorption medium 2 has the capability of removing a substantial portion of the arsenic, even when the arsenic is present in the feed stream 8 at a low concentration. Since the adsorption medium 2 has a high capacity for the constituents, the feed stream 8' that exits the adsorption medium 2 may be substantially free of the constituents. In other words, the feed stream 8' is substantially free of arsenic, selenium, antimony, or technetium and, therefore, may be (in the absence of other contaminants) a potable water supply. The adsorption media 2 may be packed into a bed 10 that is used at the well head or other point of origin of a water supply as described in the '181 application.

The following examples serve to explain embodiments of the present invention in more detail. These examples are not to be construed as being exhaustive, exclusive, or otherwise limiting as to the scope of this invention.

EXAMPLES

Solvents and reagents used in the synthesis and isolation of HIO particles and the preparation of PAN/HIO beads were purchased from commercial sources, such as from Sigma-Aldrich Co. (St Louis, Mo.). The solvents and reagents used were of reagent grade or higher.

Example 1

Preparation of HIO Using DMSO as a Reaction Solvent

HIO particles were prepared using DMSO as a reaction solvent. Iron(III) chloride hexahydrate ($Fe_3Cl_3.6H_2O$) (45 g) was dissolved with stirring in concentrated DMSO (120 ml) by heating the DMSO to approximately 60° C. Air was bubbled through the solution using a gas dispersion tube (glass tube with fitted glass tip) to convert the iron(III) chloride hexahydrate to HIO. With constant stirring, concentrated sodium hydroxide (16.59 M) was added dropwise to titrate the HIO/DMSO solution to a pH of from approximately 6.5 to less than approximately 7.0. The sodium hydroxide was prepared by dissolving pellets of sodium hydroxide in water. The reaction of the iron(III) chloride hexahydrate with oxygen from the air formed a viscous dark brown precipitate, which was collected by filtration and identified as HIO. The water content of the filtered HIO was approximately 46%. Since aqueous sodium hydroxide was used, the filtered HIO included some water. However, the water content in the HIO particles was less than the water content present in HIO particles produced as described in the '181 application. The filtered HIO was dried in an oven at 50° C. to remove the water and residual DMSO. The dried material was crushed to powder form using a mortar and pestle and washed with water to remove residual salts and DMSO. The filtered HIO was then dried again at 50° C. The surface area of the HIO particles was measured at 291.10 m$^2$/g. In contrast, the filtered HIO particles prepared as described in Example 3 of the '181 application had a water content of approximately 70% and a surface area ranging from approximately 325 m$^2$/g to 350 m$^2$/g.

Example 2

Preparation of HIO Using Methanol as a Reaction Solvent

HIO particles were prepared in a manner similar to that described in Example 1 except methanol was used as the reaction solvent and potassium hydroxide was used instead of sodium hydroxide. Iron(III) chloride hexahydrate ($Fe_3Cl_3 \cdot 6H_2O$) (40 g) was dissolved in methanol (100 ml) with stirring. Air was bubbled through the iron(III) chloride hexahydrate/methanol solution using a gas dispersion tube (glass tube with fitted glass tip) to convert the iron(III) chloride hexahydrate to HIO. With constant stirring, potassium hydroxide (6.7 M) was added dropwise to titrate the HIO/methanol solution to a pH of from approximately 6.5 to less than approximately 7.0. The potassium hydroxide was prepared by dissolving pellets of potassium hydroxide in methanol. The reaction of the iron(III) chloride hexahydrate with oxygen from the air formed a viscous dark brown precipitate. No liquid was visible. The precipitate was allowed to air dry in a beaker at ambient temperature and identified as HIO. The surface area of HIO particles prepared in a similar manner was determined to be 288.87 m$^2$/g. The dried material was crushed to powder form.

Example 3

Preparation of HIO-PAN Beads

The HIO particles produced as described in Example 2 were formed into beads. The HIO particles (60 g) including unwashed salts (approximately 18 g $Fe_5OH_8$) were ground into a powder having a particle size of less than approximately 150 μm and combined with PAN fibers (3.68 g) and concentrated DMSO (60 ml) to produce a PAN-HIO suspension. The PAN-HIO suspension was heated to a temperature of approximately 90° C. until no visible fibers remained. Once the PAN fibers were dissolved, constant stirring or mixing with slight heat (approximately 40° C.) maintained a fine suspension of the HIO in the PAN-HIO solution. Solid beads were formed by spraying the PAN-HIO suspension through an air/nozzle device into a stirred quenching bath that included deionized water. The droplets of PAN-HIO suspension solidified into beads upon contacting the deionized water. Thus, the volume of deionized water in the quenching back should be of sufficient size to dilute the DMSO and produce the water-insoluble PAN-HIO beads. The beads were allowed to continue circulating in the stirred quenching bath for approximately 30 minutes. The beads were collected and rinsed with deionized water at 125 ml/min for three hours to remove residual salts and DMSO, and then dried overnight at 40° C. The resulting beads had a HIO loading of 83%. The surface area of the beads was approximately 266.27 m$^2$/g.

While the invention is susceptible to various modifications and alternative forms, specific embodiments have been shown by way of example in the drawings and have been described in detail herein. However, the invention is not intended to be limited to the particular forms disclosed. Rather, the invention is to cover all modifications, equivalents, and alternatives falling within the scope of the invention as defined by the following appended claims and their legal equivalents.

What is claimed is:

1. A method of producing adsorption media, comprising:
    forming particles of a metal oxide, the particles having a water content less than approximately 0.5% water, comprising:
        dissolving a metal salt in a reaction solvent to form a metal salt/reaction solvent solution;
        converting the metal salt in the metal salt/reaction solvent solution to a metal oxide to form a metal oxide/reaction solvent solution;
        titrating the pH of the metal oxide/reaction solvent solution with a non-aqueous caustic solution to precipitate the particles of the metal oxide, the non-aqueous caustic solution comprising a caustic agent in an organic solvent;
    suspending the particles of the metal oxide in a solvent to form a metal oxide suspension;
    dissolving a matrix material in the metal oxide suspension to form a matrix-metal oxide suspension; and
    depositing the matrix-metal oxide suspension into an aqueous solution.

2. The method of claim 1, wherein converting the metal salt in the metal salt/reaction solvent solution to a metal oxide comprises introducing oxygen gas or air into the metal salt/reaction solvent solution.

3. The method of claim 2, wherein introducing oxygen gas or air into the metal salt/reaction solvent solution comprises flowing an excess of the oxygen gas or the air into the metal salt/reaction solvent solution.

4. The method of claim 1, wherein titrating the pH of the metal oxide/reaction solvent solution with a non-aqueous caustic solution to precipitate the particles of the metal oxide comprises titrating the pH of the metal oxide/reaction solvent solution to a pH less than approximately 7.0.

5. The method of claim 4, wherein titrating the pH of the metal oxide/reaction solvent solution to a pH less than approximately 7.0 comprises titrating the pH of the metal oxide/reaction solvent solution to a pH between approximately 6.5 and approximately 6.9.

6. The method of claim 1, wherein dissolving a metal salt in a reaction solvent to form a metal salt/reaction solvent solution comprises dissolving a metal salt in a reaction solvent selected from the group consisting of methanol, ethanol, propanol, acetone, and combinations thereof.

7. The method of claim 1, wherein dissolving a metal salt in a reaction solvent to form a metal salt/reaction solvent solution comprises dissolving a chloride, an oxychloride, a sulfate, a nitrate, or an acetate of a metal cation in the reaction solvent.

8. The method of claim 1, wherein suspending the particles of the metal oxide in a solvent to form a metal oxide suspension comprises suspending the particles of the metal oxide in the solvent without washing the particles of the metal oxide.

9. The method of claim 1, wherein titrating the pH of the metal oxide/reaction solvent solution with a non-aqueous caustic solution comprises titrating the pH of the metal oxide/ reaction solvent solution with sodium hydroxide dissolved in an organic solvent or with potassium hydroxide dissolved in an organic solvent.

10. The method of claim 1, wherein dissolving a metal salt in a reaction solvent to form a metal salt/reaction solvent solution comprises dissolving a metal salt of a transition metal, a lanthanide or rare earth metal, a Group III metal, a Group IV metal, or a Group V metal in the reaction solvent.

11. The method of claim 1, wherein dissolving a metal salt in a reaction solvent to form a metal salt/reaction solvent solution comprises dissolving an iron(III) salt in dimethylsulfoxide.

12. The method of claim 1, wherein dissolving a metal salt in a reaction solvent to form a metal salt/reaction solvent solution comprises dissolving iron(III) chloride hexahydrate in dimethylsulfoxide.

13. A method of producing adsorption media, comprising:
- oxidizing a metal salt in a reaction solvent to form a metal oxide/reaction solvent solution;
- adding a solution comprising potassium hydroxide and an alcohol to the metal oxide/reaction solvent solution to achieve a pH in the metal oxide/reaction solvent solution of less than approximately 7.0 the alcohol selected from the group consisting of methanol, ethanol, and propanol;
- precipitating particles of the metal oxide;
- suspending the particles of the metal oxide in a solvent to form a metal oxide suspension;
- dissolving a matrix material in the metal oxide suspension to form a matrix-metal oxide suspension; and
- depositing the matrix-metal oxide suspension into an aqueous solution.

* * * * *